United States Patent
Brawner

(10) Patent No.: US 8,136,777 B2
(45) Date of Patent: Mar. 20, 2012

(54) MOUNTING BRACKET FOR SECURING A VIDEO SYSTEM BEHIND A HEADREST

(75) Inventor: Jeffrey D. Brawner, Tampa, FL (US)

(73) Assignee: Audiovox Corporation, Hauppauge, NY (US)

( * ) Notice: Subject to any disclaimer, the term of this patent is extended or adjusted under 35 U.S.C. 154(b) by 83 days.

(21) Appl. No.: 12/251,027

(22) Filed: Oct. 14, 2008

(65) Prior Publication Data

US 2010/0090076 A1    Apr. 15, 2010

(51) Int. Cl.
  *A47F 5/00* (2006.01)
  *A47C 7/62* (2006.01)
(52) U.S. Cl. .............. 248/309.1; 248/118; 248/300; 248/917; 297/188.06
(58) Field of Classification Search .......... 248/309.1, 248/200, 224.8, 224.7, 118, 300, 357, 917; 297/217.3, 217.4, 188.2, 188.06
See application file for complete search history.

(56) References Cited

U.S. PATENT DOCUMENTS

| | | | |
|---|---|---|---|
| 3,512,605 A | 5/1970 | McCorkle | |
| 4,490,842 A | 12/1984 | Watanabe | |
| 4,681,366 A | 7/1987 | Lobanoff | |
| 4,757,928 A * | 7/1988 | Browne | 224/275 |
| 4,792,183 A | 12/1988 | Townsend, III | |
| 5,072,903 A * | 12/1991 | Griffin | 248/72 |
| 6,231,017 B1 * | 5/2001 | Watkins | 248/274.1 |
| 6,698,832 B2 | 3/2004 | Boudinot | |
| 7,066,544 B2 | 6/2006 | Tseng | |
| 7,070,237 B2 | 7/2006 | Rochel | |
| 7,111,814 B1 | 9/2006 | Newman | |
| 7,201,443 B2 | 4/2007 | Cilluffo et al. | |
| 7,364,230 B2 * | 4/2008 | Zheng | 297/188.2 |
| 2006/0082212 A1 * | 4/2006 | Chou et al. | 297/463.1 |

FOREIGN PATENT DOCUMENTS

WO    WO2007/129029    11/2007

\* cited by examiner

*Primary Examiner* — Anita M King
(74) *Attorney, Agent, or Firm* — F. Chau & Associates, LLC

(57) ABSTRACT

It is, therefore, an object of the present invention to provide a mounting bracket for securing a video system behind a headrest including parallel support arms. The mounting bracket includes a rear support plate adapted for substantial vertical orientation for orienting a video system secured thereto in an orientation facing the passengers seated within the rear seat of a vehicle. The rear support plate includes a front surface to which the video system is secured, a rear surface which ultimately faces the rear surface of the headrest, a top edge, a bottom edge and first and second lateral side edges. First and second attachment members extend rearwardly from the rear support plate. The first attachment member includes a top horizontal plate connected to a bottom horizontal plate. The second attachment member includes a top horizontal plate connected to a bottom horizontal plate. Each of the top and bottom horizontal plates include an aperture shaped and dimensioned for receiving the respective parallel support arms of the headrest.

21 Claims, 10 Drawing Sheets

MOUNTING BRACKET FOR SECURING A VIDEO SYSTEM BEHIND A HEADREST

BACKGROUND OF THE INVENTION

1. Field of the Invention

The invention relates to mobile video systems. More particularly, the invention relates to a mounting bracket for securing a video system behind a headrest.

2. Description of the Related Art

Entertainment systems for automobiles are well known. As such, many advances have been made in the development of entertainment systems that make the otherwise tedious task of riding in an automobile more bearable. In addition to the development of overhead systems pioneered by the present inventor, systems that mount within the headrest of an automobile have also been developed.

These headrest entertainment systems allow multiple individuals to view a variety of different video sources within the same vehicle. However, and as those skilled in the art will certainly appreciate, recent regulations regarding to the construction of headrests has made it increasingly difficult to mount a video system within a headrest in an efficient and cost effective manner. The present invention provides the ability to mount a video system adjacent a headrest in a manner allowing those sitting in the rear seat of an automobile to view the video system in the same manner as if the video system where mounted directed within the headrest.

SUMMARY OF THE INVENTION

It is, therefore, an object of the present invention to provide a mounting bracket for securing a video system behind a headrest including parallel support arms. The mounting bracket includes a rear support plate adapted for substantial vertical orientation for orienting a video system secured thereto in an orientation facing the passengers seated within the rear seat of a vehicle. The rear support plate includes a front surface to which the video system is secured, a rear surface which ultimately faces the rear surface of the headrest, a top edge, a bottom edge and first and second lateral side edges. First and second attachment members extend rearwardly from the rear support plate. The first attachment member includes a top horizontal plate connected to a bottom horizontal plate. The second attachment member includes a top horizontal plate connected to a bottom horizontal plate. Each of the top and bottom horizontal plates include an aperture shaped and dimensioned for receiving the respective parallel support arms of the headrest.

It is also an object of the present invention to provide a mounting bracket wherein the rear support plate includes four mounting holes shaped and dimensioned for receiving mounting screws for securing the video system to the mounting bracket.

It is another object of the present invention to provide a mounting bracket wherein the rear support plate includes a central aperture positioned for the passage of cables therethrough.

It is a further object of the present invention to provide a mounting bracket wherein the first and second attachment members respectively extend rearwardly from the first and second lateral side edges at a position adjacent the bottom edge of the rear support plate.

It is also an object of the present invention to provide a mounting bracket wherein first and second support arms connect the top horizontal plate of the first attachment member to the bottom horizontal plate of the first attachment member.

It is another object of the present invention to provide a mounting bracket wherein the first and second support arms connect the top horizontal plate of the second attachment member to the bottom horizontal plate of second attachment member.

Other objects and advantages of the present invention will become apparent from the following detailed description when viewed in conjunction with the accompanying drawings, which set forth certain embodiments of the invention.

DESCRIPTION OF THE PREFERRED EMBODIMENT

Figure 1:
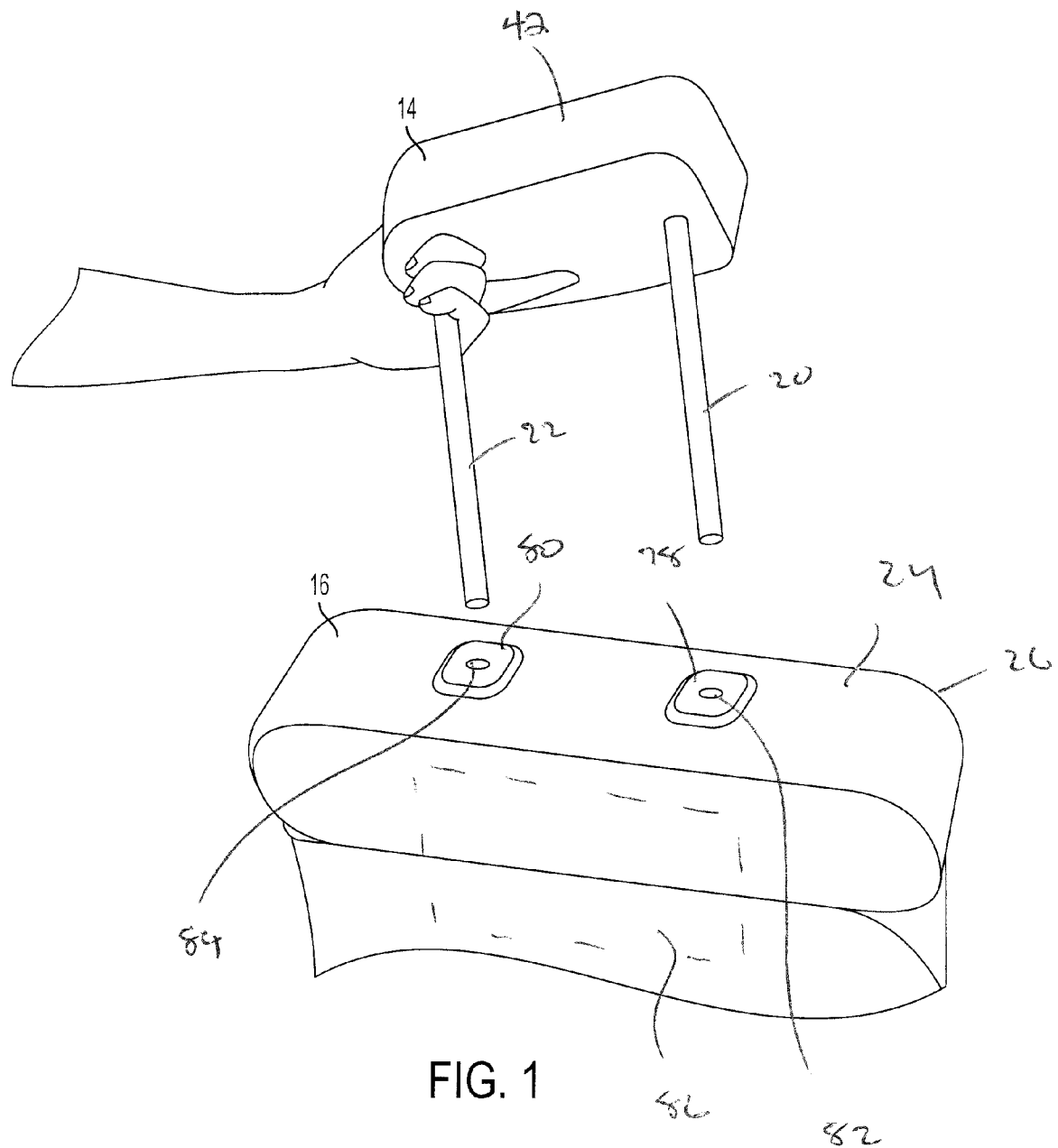
FIGS. 1 through 8 are a series of perspective views showing installation of the present mounting bracket in accordance with the present invention.
Figure 2:
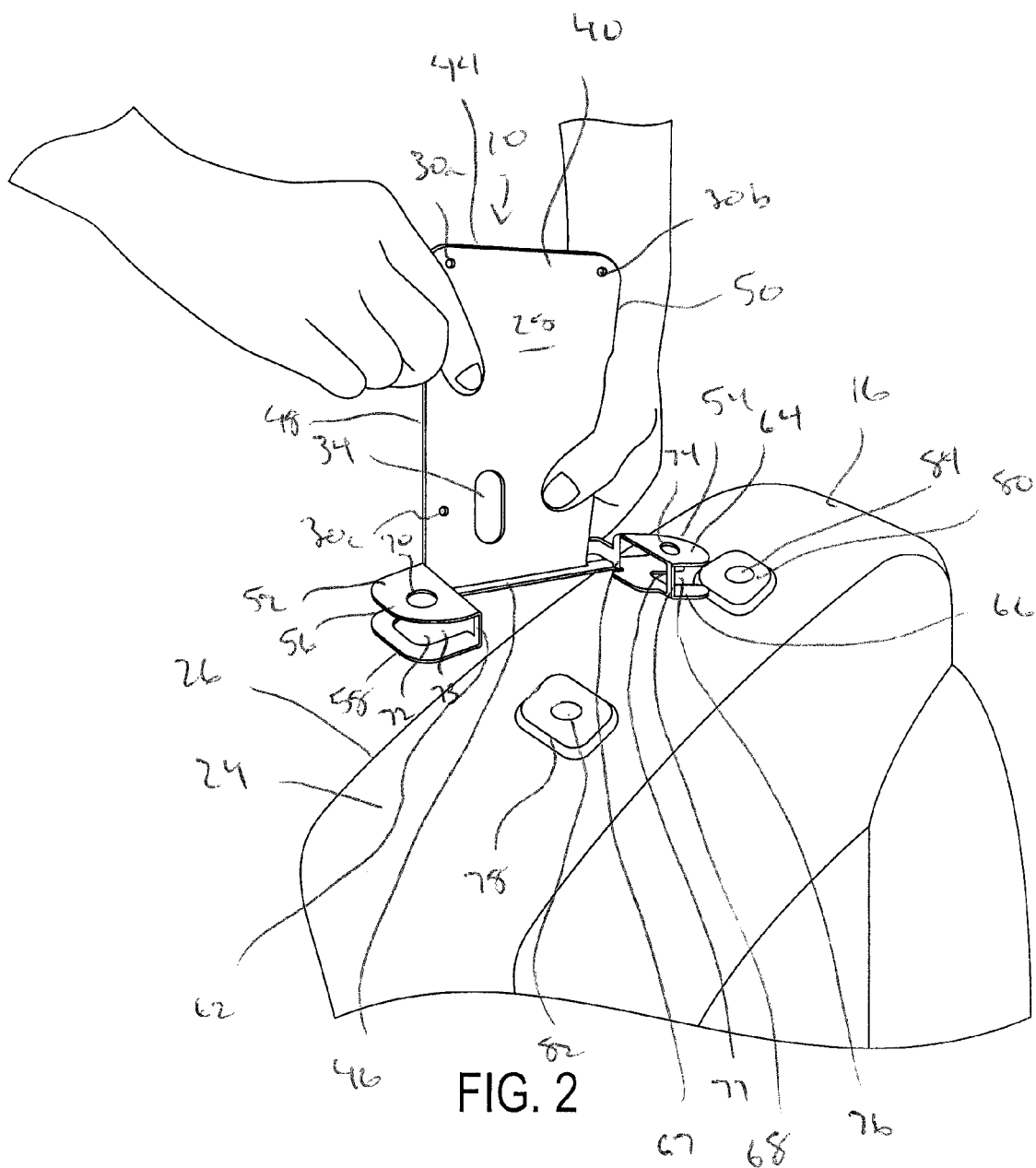
Figure 3:
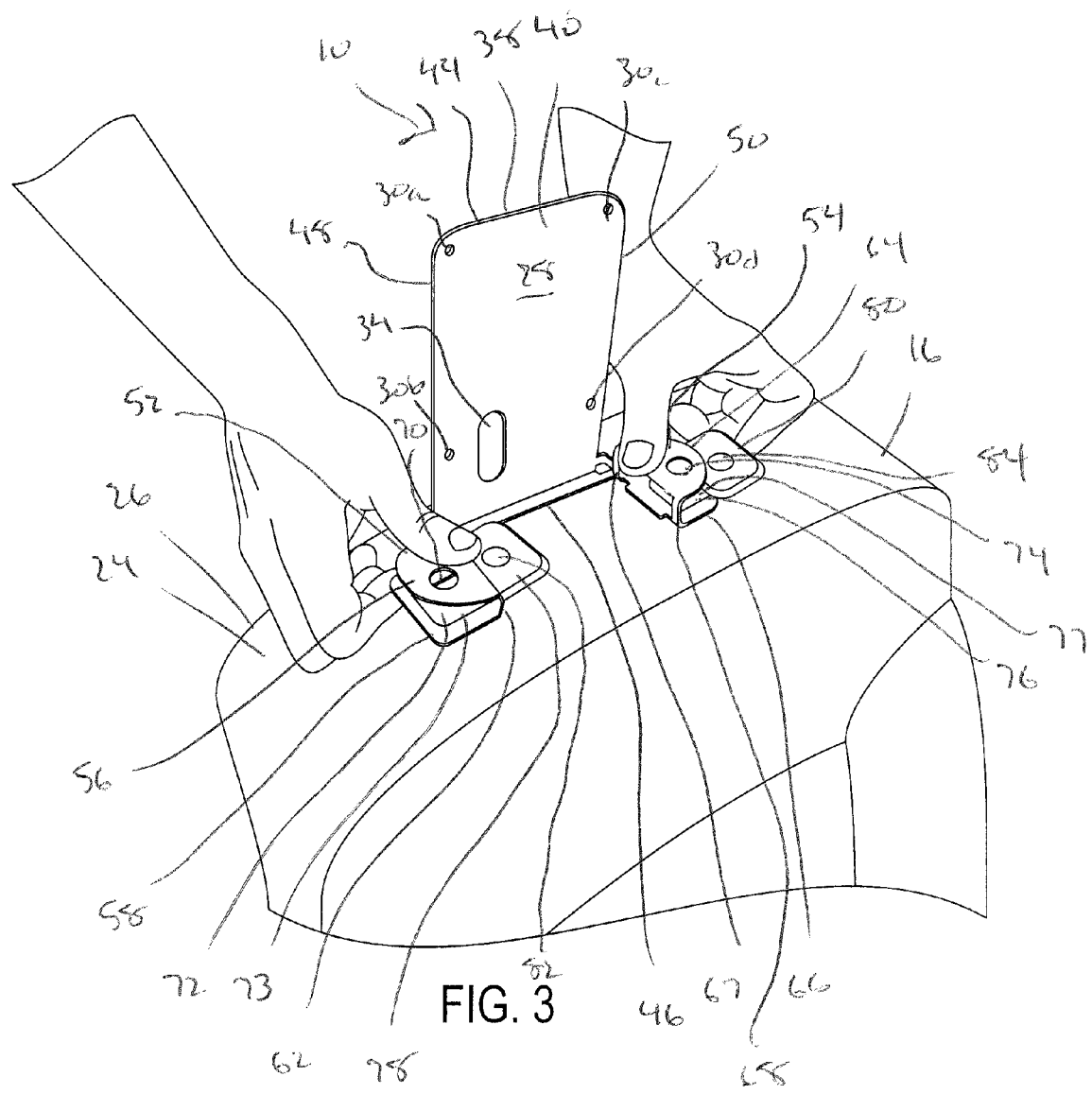
Figure 4:
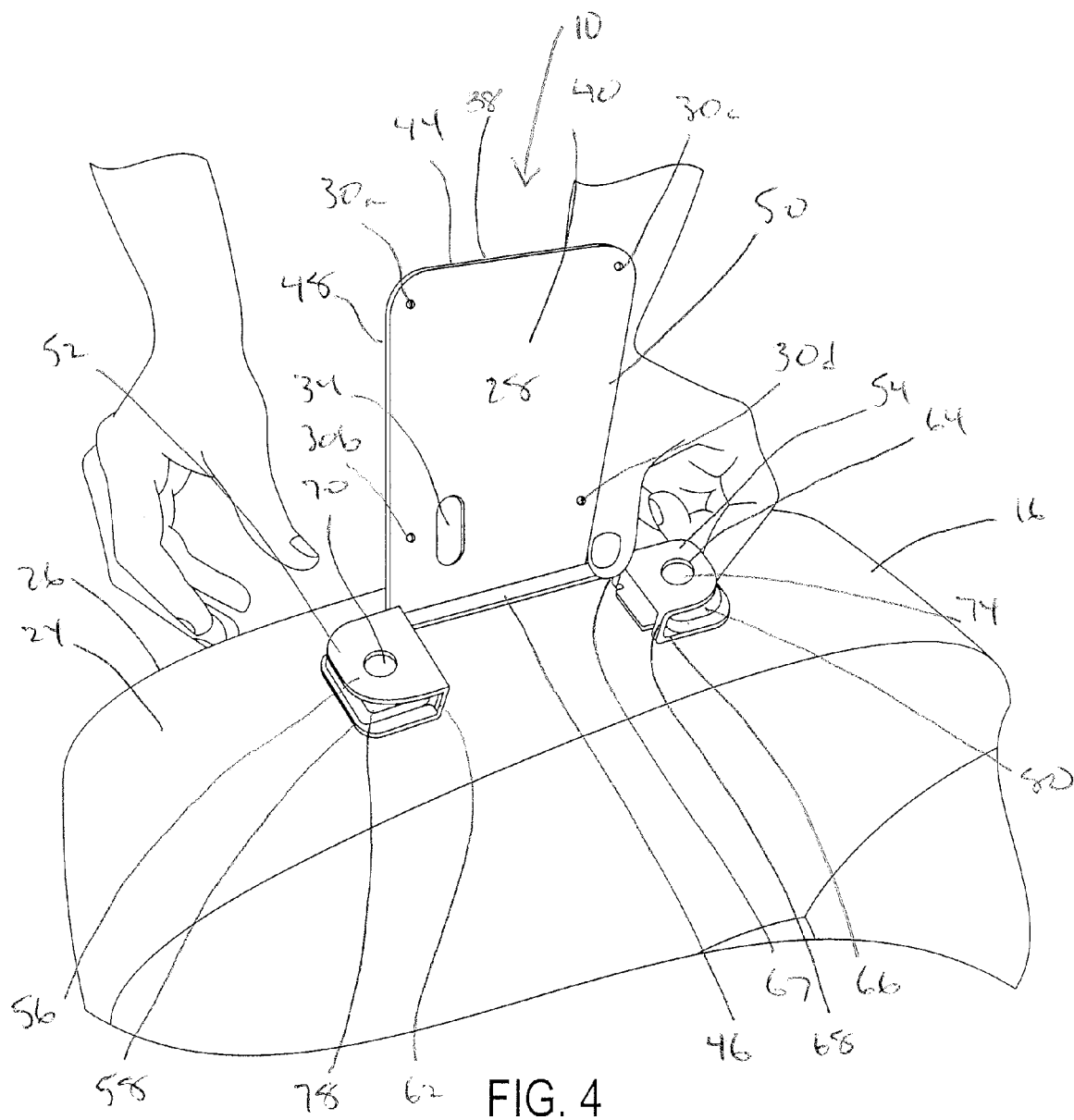
Figure 5:
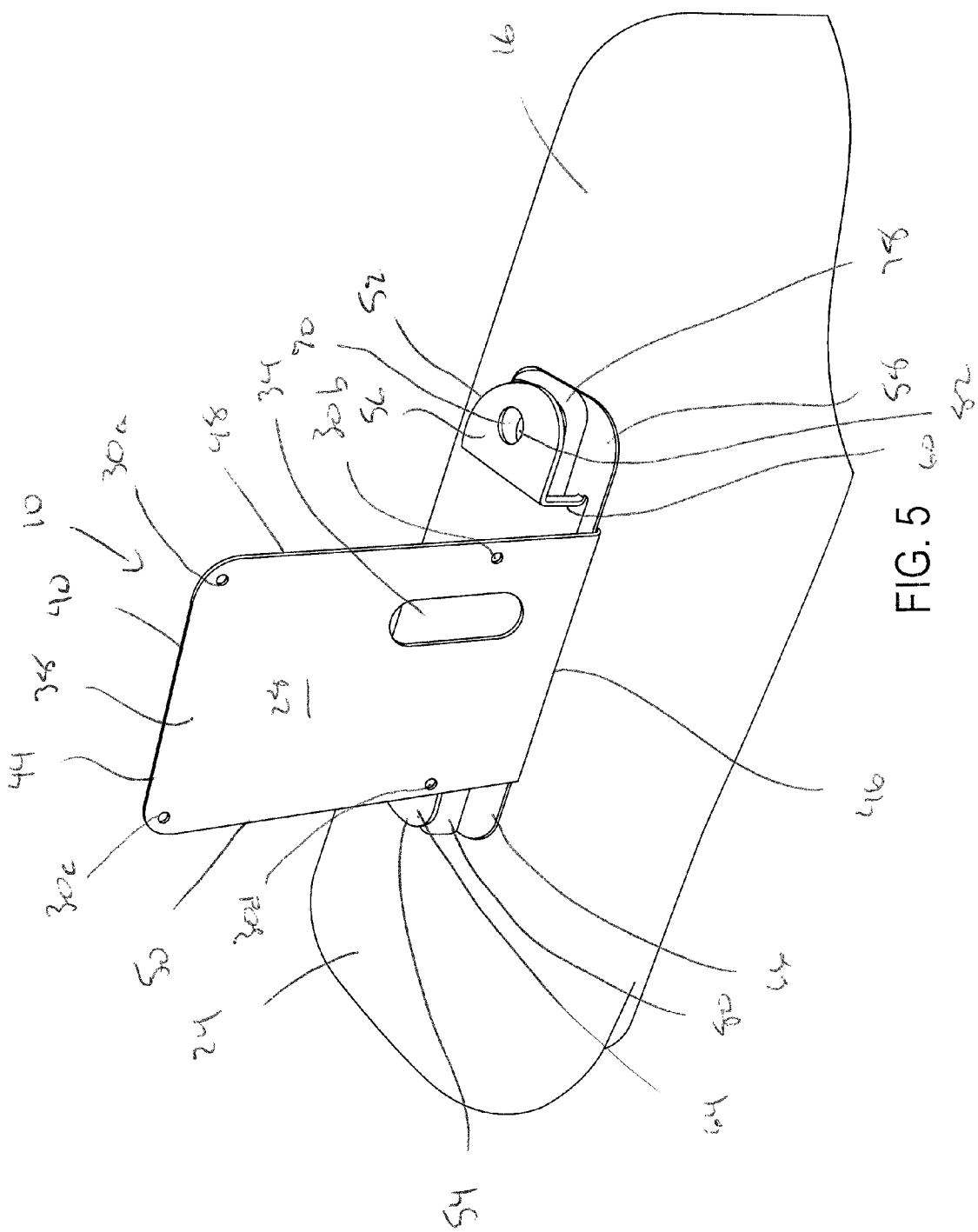
Figure 6:
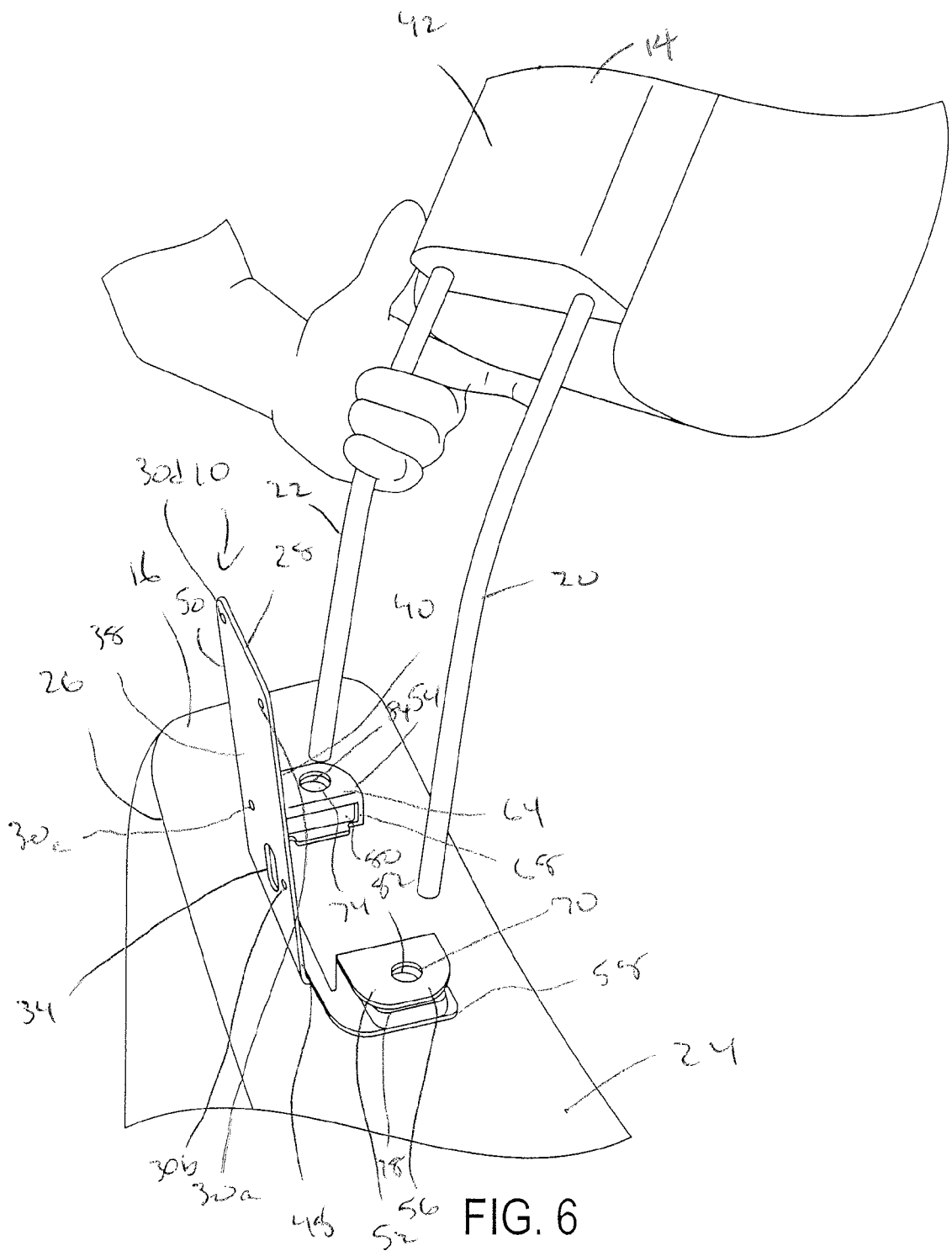
Figure 7:
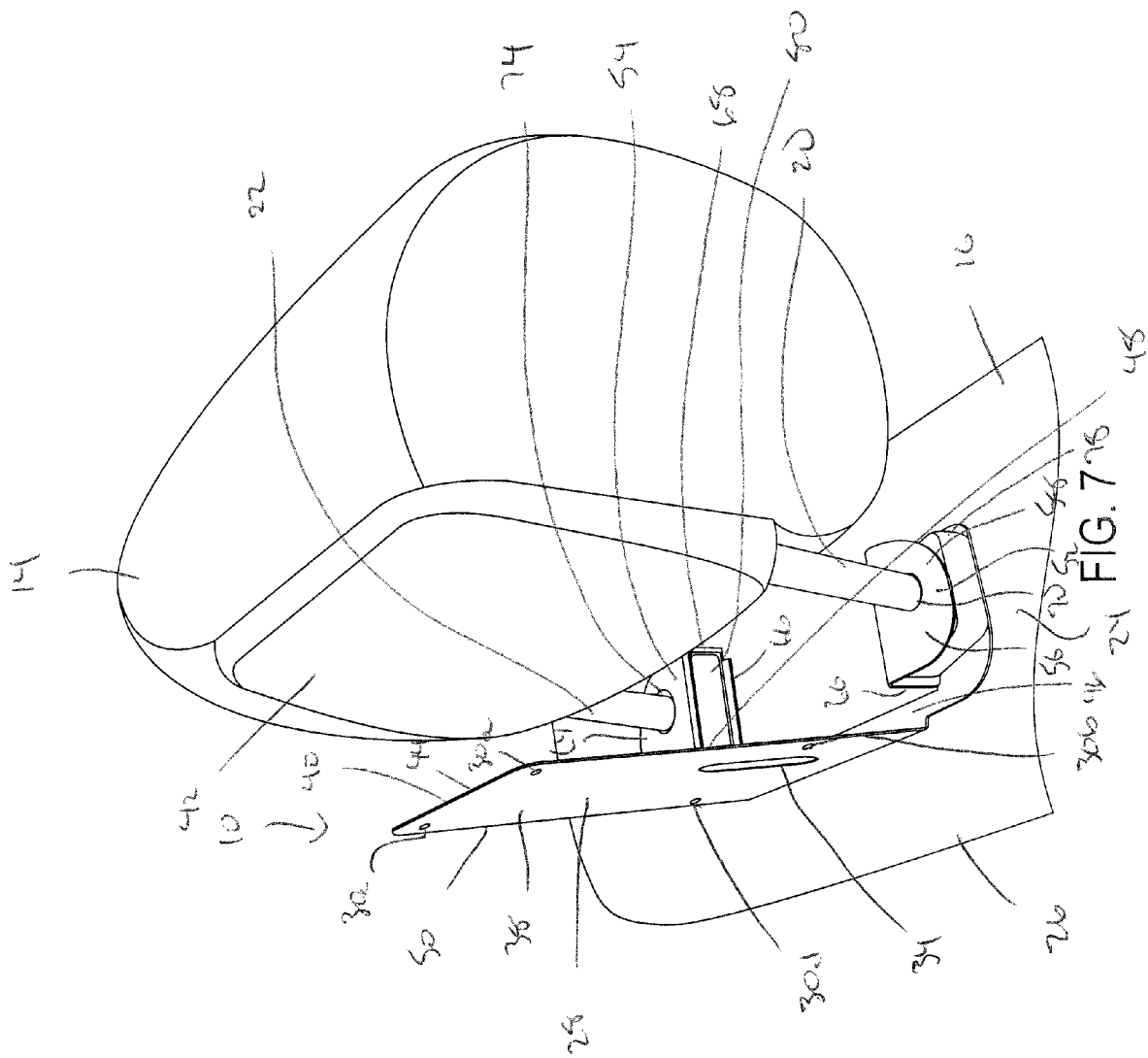
Figure 8:
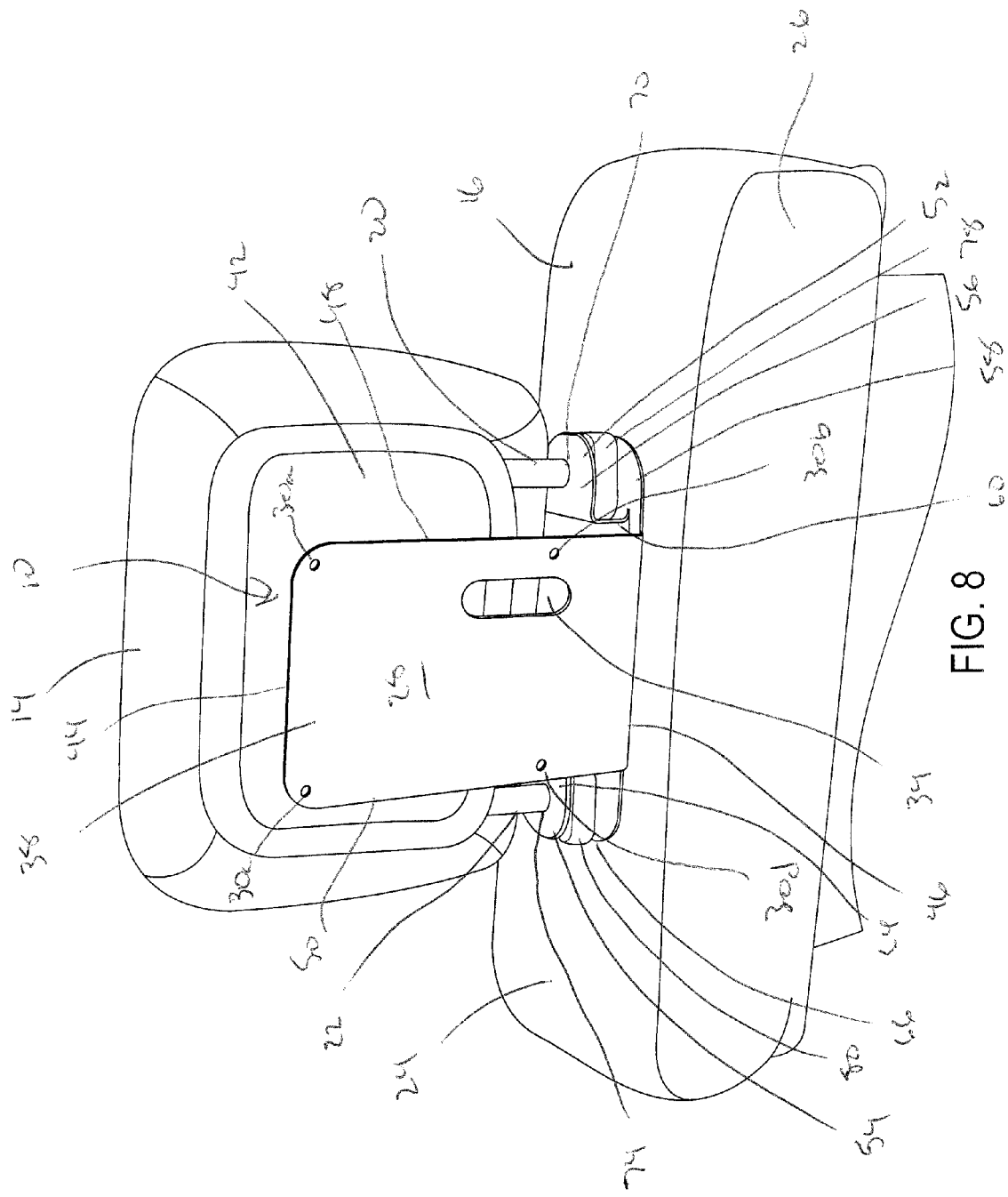

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to FIGS. 1 to 10, a mounting bracket 10 for securing a video system 12 behind a headrest 14 is disclosed. The mounting bracket 10 is designed to secure a video system 12 to a vehicle seat 16 for positioning of the video system 12 behind the headrest 14 for viewing by those sitting in a rear seat (not shown).

In accordance with a preferred embodiment, the mounting bracket 10 is shaped and dimensioned for attachment to the parallel support arms 20, 22 of the headrest 14. In most vehicles, the parallel support arms 20, 22 extend between the upper end 24 of the seat back 26 and the headrest 14 itself for adjustably positioning the headrest 14 at various heights designed to improve the effectiveness of the headrest 14 for passengers of various sizes. The mounting bracket 10 includes a rear support plate 28 which is adapted for substantial vertical orientation for orienting a video system 12 secured thereto in an orientation facing the passengers seated within the rear seat of a vehicle. With this in mind, the rear support plate 28 is provided with four mounting holes 30*a-d* at predetermined locations such that mounting screws 32 may pass therethrough for securing the video system 12 to the mounting bracket 10. The rear support plate 28 is further provided with a central aperture 34. The central aperture 34 is positioned for the passage of cables therethrough. The cables may be utilized in providing the video system 12 with both power and audio/video content for display upon the video monitor 36.

The rear support plate 28 includes a front surface 38 to which the video system 12 is secured, a rear surface 40 which ultimately faces the rear surface 42 of the headrest 14, a top edge 44, a bottom edge 46 and first and second lateral side edges 48, 50. Extending rearwardly from the first and second lateral side edges 48, 50 at a position adjacent the bottom edge 46 of the rear support plate 28, are first and second attachment members 52, 54. The first attachment member 52 includes a top horizontal plate 56 connected to a bottom horizontal plate 58 via first and second support arms 60, 62. The second attachment member 54 includes a top horizontal plate 64 and a bottom horizontal plate 66 connected by first and second support arms 67, 68 similar to those of the first attachment member 52.

Each of the first and second attachment members 52, 54, and in particular, the top and bottom horizontal plates 56, 58, 64, 66 include apertures 70, 72, 74, 76 through which the respective parallel support arms 20, 22 of the headrests may be positioned for mounting and secure attachment adjacent thereto.

In practice, and with reference to FIGS. 1 to 8, the present mounting bracket 10 is secured to the upper end 24 of a vehicle seat 16 in the following manner. First, the headrest 14, including the first and second parallel support arms 20, 22, is removed from the upper end 24 of the vehicle seat 16. Thereafter, the mounting bracket 10 is positioned adjacent the upper trim plates 78, 80 through which the parallel support arms 20, 22 extend as they are positioned within the vehicle seat 16. The bottom horizontal plates 58, 66 of the respective first and second attachment members 52, 54 are positioned such that the trim plates 78, 80 of the vehicle seat 16 sit within the apertures 72, 76 formed therein. The apertures 72, 76 of the bottom horizontal plates 58, 66 of the first and second attachment members 52, 54 are formed with substantially U-shaped openings 73, 77 such that the bottom horizontal plates 58, 66 of the first and second attachment members 52, 54 may be simply slid laterally such that the trim plates 78, 80 of the vehicle seat 16 fit within the apertures 72, 76 of the bottom horizontal plates 58, 66 of the first and second attachment members 52, 54. In order to permit installation with the lateral movement shown and described herein, the U-shaped openings 73, 77 face the same direction.

With the bottom horizontal plates 58, 66 of the first and second attachment members 52, 54 properly positioned about the trim plates 78, 80 of the vehicle seat 16, the top horizontal plates 56, 64 should sit directly above the trim plates 78, 80 of the vehicle seat 16 with the apertures 70, 74 of the top horizontal plates 56, 64 of the first and second attachment members 52, 54 substantially aligned with the apertures 82, 84 within the vehicle seat 16 and trim plates 78, 80 through which the first and second parallel support arms 20, 22 extend when the headrest 14 is securely positioned upon the vehicle seat 16. Thereafter, the first and second parallel support arms 20, 22 are passed through the apertures 70, 72, 74 76 formed in the top horizontal plates 56, 64 of the first and second attachment members 52, 54 and the bottom horizontal plates 58, 66 of the first and second attachment member 52, 54, and into the apertures 82, 84 formed in the upper end 24 of the vehicle seat 16 for receiving the first and second parallel support arms 20, 22.

With this configuration, the first and second parallel support arms 20, 22 are securely attached to the upper end 24 of the vehicle seat 16 via the conventional headrest support structure 86. By passing the first and second parallel support arms 20, 22 through the apertures 70, 74 of the top horizontal plates 56, 64 of the first and second attachment members 52, 54, the mounting bracket 10 is prevented from moving laterally. In addition, upward movement is also prevented by the frictional interaction of the apertures 72, 76 of the bottom horizontal plates 58, 66 of the first and second attachment members 52, 54 as they interact with the trim plates 78, 80 of the vehicle seat 16.

Figure 9:
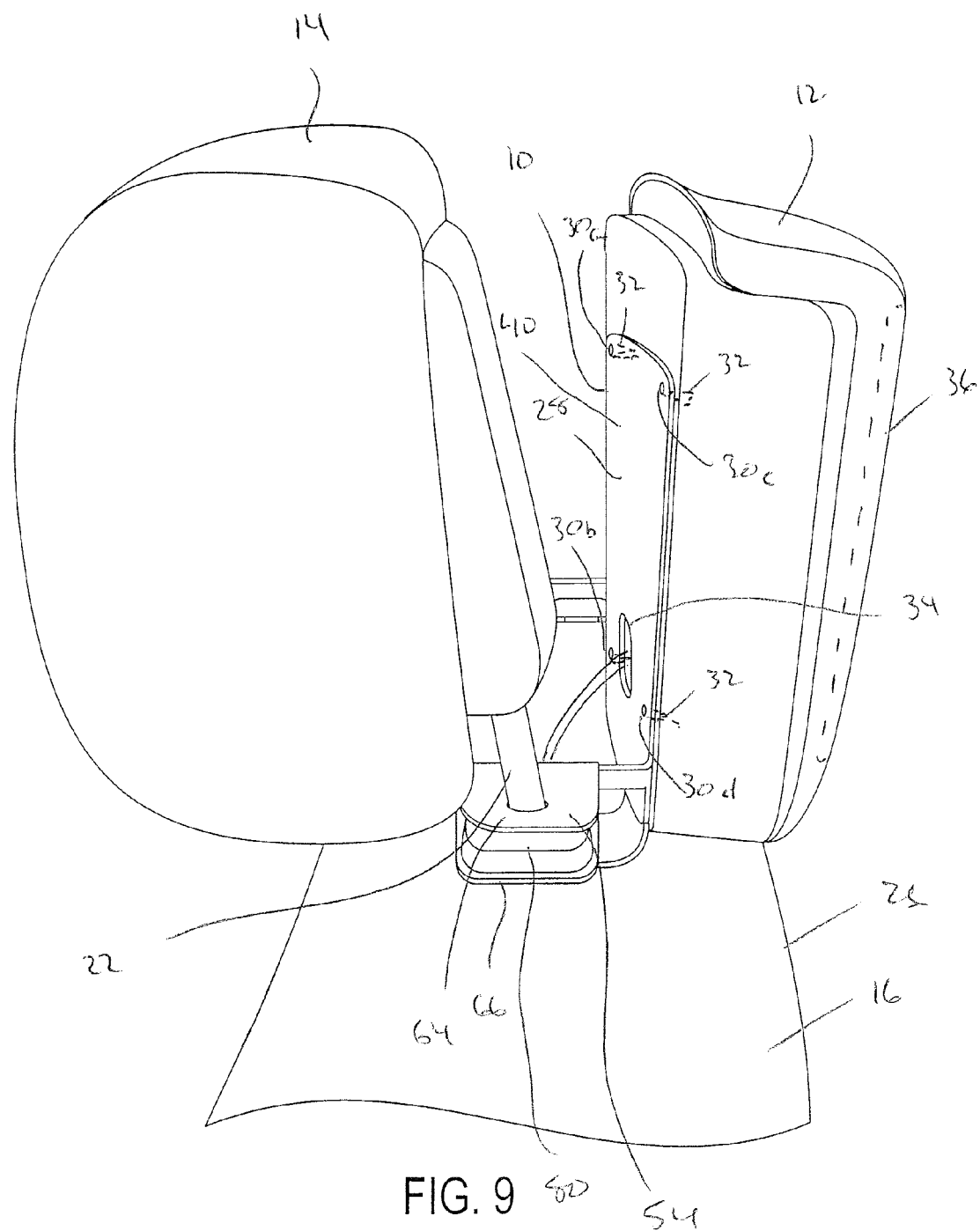
FIG. 9 is a side view of a fully installed video system employing the mounting bracket of the present invention.
Figure 10:
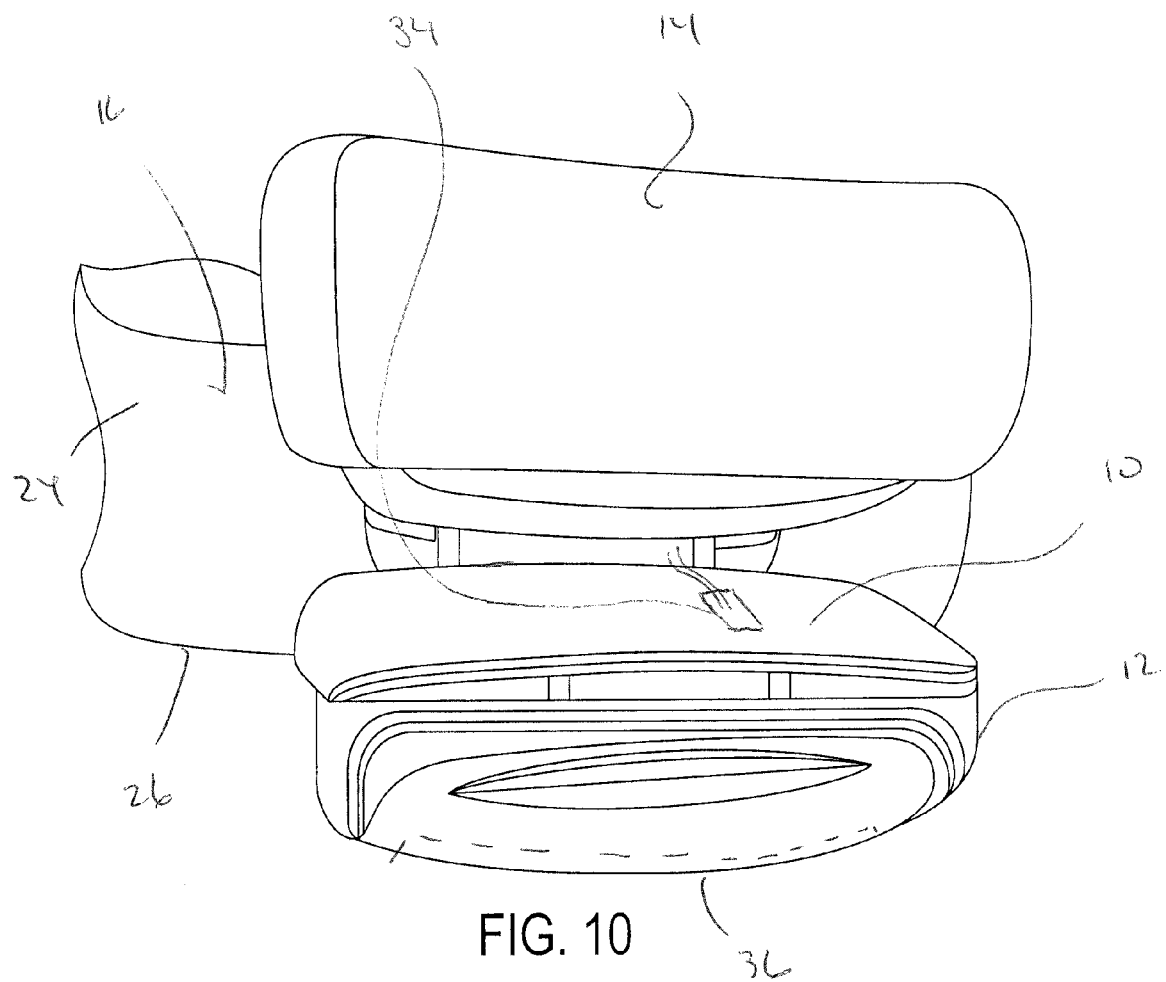
FIG. 10 is a top view of a fully installed video system employing the present mounting bracket.

The video system 12 may then be secured to the mounting bracket 10 for viewing by one sitting within the rear seat of an automobile (see FIGS. 9 and 10). As those skilled in the art will certainly appreciate, the video system 12 may be premounted to the rear support plate 28 and the mounting bracket 10 may be secured to the vehicle seat 16 with the video system 12 already installed and secured thereto.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A mounting bracket for securing a video system behind a headrest including parallel support arms, comprising:
    a rear support plate adapted for substantial vertical orientation for orienting the video system secured thereto in an orientation facing passengers seated within a rear seat of a vehicle, the rear support plate includes a front surface to which the video system is secured, a rear surface which ultimately faces the rear surface of the headrest, a top edge, a bottom edge and first and second lateral side edges;
    first and second attachment members extend rearwardly from the rear support plate, the first attachment member includes a top horizontal plate connected to a bottom horizontal plate, and the second attachment member includes a top horizontal plate connected to a bottom horizontal plate;
    each of the top and bottom horizontal plates includes an aperture shaped and dimensioned for receiving the respective parallel support arms of the headrest; and
    wherein the rear support plate includes four mounting holes shaped and dimensioned for receiving mounting screws for securing the video system to the mounting bracket.

2. The mounting bracket according to claim 1, wherein the rear support plate includes a central aperture positioned for the passage of cables therethrough.

3. The mounting bracket according to claim 1, wherein first and second support arms connect the top horizontal plate of the first attachment member to the bottom horizontal plate of the first attachment member.

4. The mounting bracket according to claim 1, wherein first and second support arms connect the top horizontal plate of the second attachment member to the bottom horizontal plate of the second attachment member.

5. The mounting bracket according to claim 1, wherein the first and second attachment members respectively extend rearwardly from the first and second lateral side edges at a position adjacent the bottom edge of the rear support plate.

6. A mounting bracket for securing a video system behind a headrest including parallel support arms, comprising:
    a rear support plate adapted for substantial vertical orientation for orienting the video system secured thereto in an orientation facing passengers seated within a rear seat of a vehicle, the rear support plate includes a front surface to which the video system is secured, a rear surface which ultimately faces the rear surface of the headrest, a top edge, a bottom edge and first and second lateral side edges;
    first and second attachment members extend rearwardly from the rear support plate, the first attachment member includes a top horizontal plate connected to a bottom horizontal plate, and the second attachment member includes a top horizontal plate connected to a bottom horizontal plate;
    each of the top and bottom horizontal plates includes an aperture shaped and dimensioned for receiving the respective parallel support arms of the headrest; and wherein the first and second attachment members respectively extend rearwardly from the first and second lateral side edges at a position adjacent the bottom edge of the rear support plate.

7. The mounting bracket according to claim 6, wherein the rear support plate includes four mounting holes shaped and dimensioned for receiving mounting screws for securing the video system to the mounting bracket.

8. The mounting bracket according to claim 6, wherein the rear support plate includes a central aperture positioned for the passage of cables therethrough.

9. The mounting bracket according to claim 6, wherein first and second support arms connect the top horizontal plate of the first attachment member to the bottom horizontal plate of the first attachment member.

10. The mounting bracket according to claim 6, wherein first and second support arms connect the top horizontal plate of the second attachment member to the bottom horizontal plate of the second attachment member.

11. A mounting bracket for securing a video system behind a headrest including parallel support arms, comprising:
a rear support plate adapted for substantial vertical orientation for orienting the video system secured thereto in an orientation facing passengers seated within a rear seat of a vehicle, the rear support plate includes a front surface to which the video system is secured, a rear surface which ultimately faces the rear surface of the headrest, a top edge, a bottom edge and first and second lateral side edges;
first and second attachment members extend rearwardly from the rear support plate, the first attachment member includes a top horizontal plate connected to a bottom horizontal plate, and the second attachment member includes a top horizontal plate connected to a bottom horizontal plate;
each of the top and bottom horizontal plates includes an aperture shaped and dimensioned for receiving the respective parallel support arms of the headrest, and the apertures of the bottom horizontal plates of the first and second attachment members are formed with substantially U-shaped openings.

12. The mounting bracket according to claim 11, wherein the U-shaped openings face the same direction.

13. The mounting bracket according to claim 11, wherein the rear support plate includes four mounting holes shaped and dimensioned for receiving mounting screws for securing the video system to the mounting bracket.

14. The mounting bracket according to claim 11, wherein the rear support plate includes a central aperture positioned for the passage of cables therethrough.

15. The mounting bracket according to claim 11, wherein the first and second attachment members respectively extend rearwardly from the first and second lateral side edges at a position adjacent the bottom edge of the rear support plate.

16. The mounting bracket according to claim 11, wherein first and second support arms connect the top horizontal plate of the first attachment member to the bottom horizontal plate of the first attachment member.

17. The mounting bracket according to claim 11, wherein first and second support arms connect the top horizontal plate of the second attachment member to the bottom horizontal plate of the second attachment member.

18. A mounting system for securing a video system behind a headrest including parallel support arms, comprising:
a rear support panel adapted for substantial vertical orientation for orienting the video system in an orientation facing passengers seated within a rear seat of a vehicle, the rear support panel including a front surface, a rear surface which ultimately faces the rear surface of the headrest, a top edge, a bottom edge and first and second lateral side edges;
first and second attachment members extending rearwardly from the rear support panel, the first attachment member including a first horizontal plate and a second horizontal plate positioned over the first horizontal plate, and the second attachment member including a third horizontal plate and a fourth horizontal plate positioned over the third horizontal plate;
each of the horizontal plates including an aperture shaped and dimensioned for receiving the respective parallel support arms of the headrest; and
wherein the rear support panel includes a plurality of mounting holes shaped and dimensioned for receiving mounting devices for securing the video system to the rear support panel.

19. A mounting system for securing a video system behind a headrest including parallel support arms, comprising:
a rear support panel adapted for substantial vertical orientation for orienting the video system in an orientation facing passengers seated within a rear seat of a vehicle, the rear support panel including a front surface, a rear surface which ultimately faces the rear surface of the headrest, a top edge, a bottom edge and first and second lateral side edges;
first and second attachment members extending rearwardly from the rear support panel, the first attachment member including a first horizontal plate and a second horizontal plate positioned over the first horizontal plate, and the second attachment member including a third horizontal plate and a fourth horizontal plate positioned over the third horizontal plate;
each of the horizontal plates including an aperture shaped and dimensioned for receiving the respective parallel support arms of the headrest.

20. A mounting bracket for securing a video system behind a headrest including parallel support arms, comprising:
a rear support plate adapted for substantial vertical orientation for orienting the video system in an orientation facing passengers seated within a rear seat of a vehicle, the rear support plate including a front surface, a rear surface which ultimately faces the rear surface of the headrest, a top edge, a bottom edge and first and second lateral side edges;
an attachment member extending rearwardly from the rear support plate, the attachment member including a first horizontal plate and a second horizontal plate positioned over the first horizontal plate;
the horizontal plates each including an aperture shaped and dimensioned for receiving a parallel support arm of the headrest; and
wherein the rear support plate includes a plurality of mounting holes shaped and dimensioned for receiving mounting devices for securing the video system to the rear support plate.

21. A mounting bracket for securing a video system behind a headrest including parallel support arms, comprising:
a rear support plate adapted for substantial vertical orientation for orienting the video system in an orientation facing passengers seated within a rear seat of a vehicle, the rear support plate including a front surface, a rear surface which ultimately faces the rear surface of the headrest, a top edge, a bottom edge and first and second lateral side edges;

an attachment member extending rearwardly from the rear support plate, the attachment member including a first horizontal plate and a second horizontal plate positioned over the first horizontal plate; the horizontal plates each including an aperture shaped and dimensioned for receiving a parallel support arm of the headrest.

* * * * *